Jan. 15, 1929.
C. C. ROBERTS
1,698,736
FISHING TACKLE ATTACHMENT
Original Filed Oct. 12, 1925
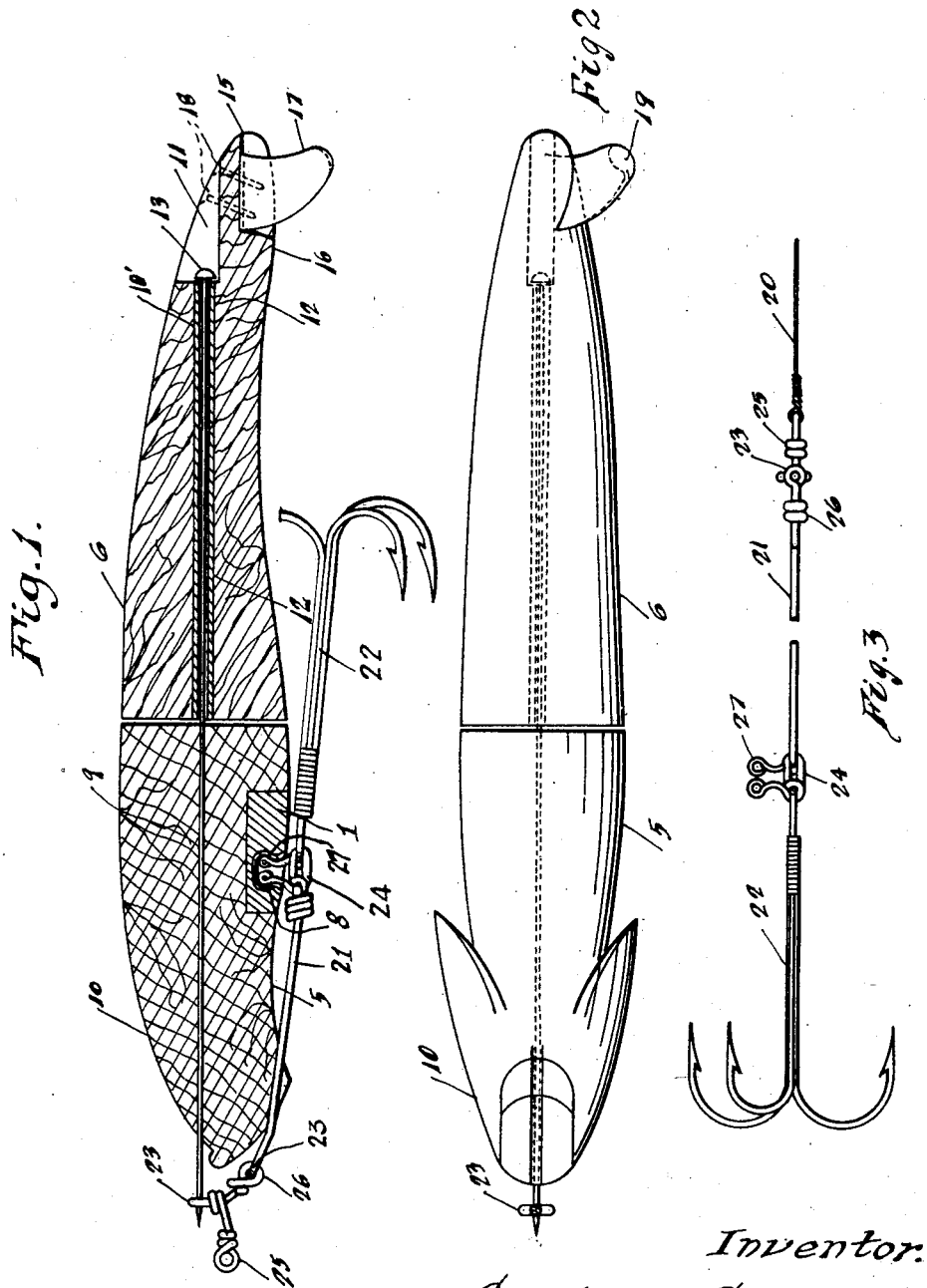
Inventor:
Constance C. Roberts,
By Joshua R. H. Potts
his Attorney.

Patented Jan. 15, 1929.

1,698,736

UNITED STATES PATENT OFFICE.

CONSTANCE C. ROBERTS, OF MOSINEE, WISCONSIN.

FISHING-TACKLE ATTACHMENT.

Application filed October 12, 1925, Serial No. 61,911. Renewed August 4, 1928.

My invention relates to a fishing tackle attachment, designed especially for releasably connecting the tackle to a fish lure or a bait arrangement, and the main object of my invention is the provision of an improved attachment of this character which is simple in construction, efficient in operation and economical in manufacture.

Another object of my invention is the provision of a novel tackle which may be so associated with a lure or bait that the striking force of the fish or the struggles thereof upon being hooked will free the tackle from the lure or bait. Certain features of my improvements, herein illustrated and described, but not herein claimed, are claimed in my companion application for Letters Patent of the United States, filed October 12, 1925, for fish lures, Serial No. 61,910.

Other objects will appear hereinafter.

The invention consists in the combinations and arrangements of parts hereinafter described and claimed.

The invention will be best understood by reference to the accompanying drawing forming a part of this specification, and in which, Fig. 1 depicts a longitudinal sectional view through a lure and depicts also my improved tackle apparatus as associated therewith;

Fig. 2 is an underneath plan view of the lure with a tackle apparatus associated therewith;

Fig. 3 represents a detail view of the tackle apparatus disconnected from the lure.

The preferred form of my invention as illustrated in the accompanying drawing, comprises a floatable body made in simulation of a fish and composed of a self-stabilizing part 5 and a spinner part 6, the self-stabilizing part 5 representing the forward portion of the fish-like body while the spinner part 6 represents the rear portion thereof. The forward body part 5 has a weight 7 embedded in its underside in a central position, as shown, to serve as a stabilizer. Arranged within the weight is a keeper member 8 in the form of a socket adapted to receive and releasably retain a catch member provided on the tackle apparatus, hereinafter to be described.

Extending longitudinally through the stabilizing body part 5 is a spindle 9 which, as shown, extends for a distance beyond the head 10 in order to serve as a support for the tackle apparatus, and which also extends well to the rear of this body part in order to serve as an axis on which to spin the rear body part 6. Preferably and as shown, the spindle 9 has a drive fit through the body part 5, although it may be made fast therewith in any other suitable manner. For the reception of the spindle 9, the rear body part 6 is provided with a bore 10' which communicates at its rear end with a recess 11 cut inwardly from the back of the lure as shown. Arranged within the bore 10' is a suitable tubular member 12 which serves as a bearing for the spinner or body part 6. The spindle 9, within the recess 11, has a retaining head 13 for holding the body part 6 in operative position. In accordance with a feature of my improvements, the spinner or rear body part 6 not only tapers in a fish-like form towards its tail end 15, but it also has a pronounced curve or bend 16 laterally of its axis of rotation so that the said portion 15 will have a lashing or a swishing action in the water when the body part 6 revolves. A fin member 17, secured within a recess 14 in the tail portion 15 by means of pins 18 or otherwise, is designed to respond to water pressure when the lure is drawn through the water, for the purpose of effecting the spinning of the rear body 6. To this end the fin 17 is made with an outwardly and downwardly directed portion 19 adapted to receive the water pressure whereby to set-up sufficient resistance for rotating the body part 6 as the lure is drawn through the water.

The tackle apparatus in its preferred embodiment comprises a leader 20, a link 21 and the usual fish hook 22, the leader 20 being connected with the link 21 by means of a slip-loop member 23, while the link 21 is connected with the hook 22 by means of a catch member 24. As herein constructed, the slip-loop member 23 has an eye 25 with which the leader 20 is linked and a separate eye 26 with which the link 21 is engaged, the said eyes 25 and 26 projecting in opposite directions and lying substantially in the same plane as shown. The slip-loop member 23, which rises intermediate the positions of said eyes 25 and 26, is designed to slip over the protruding end of the spindle 9. The catch member 24 is preferably constructed with two opposing hook-like arms 27 designed to be slipped into the keeper 8 and to be releasably held thereby. This entire arrangement is such that when the hook-like arms 27 are engaged within the keeper 8, the slip-loop member 23 cannot be disengaged from the spindle 9; but when the said arms 27 are withdrawn from their keeper 8, the slip-loop 23 will readily slip off the spindle 9 thereby entirely freeing the lure from the tackle apparatus.

Muskellunge attack their prey from underneath and my improved lure and tackle apparatus has, it will be noted, been constructed and arranged to accord with this method of attack. When the fisherman reels in the lure, the hook 22, swingable upon the catch 24, rises to occupy a position underneath the lure, as illustrated in the drawing. When the fish strikes the lure underneath, the hook 22 is enclosed by its mouth and the force of the strike jars loose or effects the release of the catch member arms 27 from the keeper 8. Since the hook 22 is encompassed by the mouth of the fish the points thereof readily become imbedded in or about the mouth of the fish. Should the arms of the catch member not be disengaged from the keeper as a result of the striking effort of the fish, they will positively be disengaged as a result of the maneuvers of the fish in its efforts to disengage the hook from its mouth. Upon the disengagement of the catch arms from their keeper, the slip-loop readily slips off the spindle releasing the lure which floats off and may subsequently be picked up from the water by the fisherman, who in fishing for muskellunge, usually employs a boat.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. In combination with a fish lure having a projecting member and a keeper, of a tackle provided with a slip-loop for engaging over said projecting member, and a catch for releasably engaging said keeper, substantially as described.

2. In combination with a fish lure having a projecting member and a keeper, of a tackle provided with a slip-loop for engaging over said projecting member; and a catch for releasably engaging said keeper; and a link between the slip-loop and catch to prevent withdrawal of the slip-loop when the catch is engaged, substantially as described.

3. In combination with a fish lure having a projecting member and a keeper, of a tackle including a hook, a loop and a catch; said loop being adapted to be placed on said projecting member; and said catch being adapted to be engaged with said keeper, substantially as described.

4. The combination of a fish lure provided with a projecting member and a socket-keeper, of a leader having a slip-loop adapted to engage over said projecting member; a fish hook provided with a catch adapted to be releasably engaged with said socket-keeper; and a link connecting said slip-loop with said catch, substantially as described.

5. In a fishing tackle, a member provided with a keeper; a fish hook provided with a catch having opposed arms engaging said keeper and adapted to be withdrawn therefrom on the exertion of force tending to separate said member and said catch, substantially as described.

6. A fish lure comprising a floatable body composed of a stabilizing part and a spinner part; and means combined with said stabilizing part for releasably associating a tackle therewith and consisting of a loop receiving rod and a catch receiving keeper, substantially as described.

In testimony whereof I have signed my name to this specification.

CONSTANCE C. ROBERTS.